(12) United States Patent
Klos et al.

(10) Patent No.: US 9,436,683 B2
(45) Date of Patent: Sep. 6, 2016

(54) METHODS AND SYSTEMS OF ASSISTIVE FOOD PREPARATION

(71) Applicants: Patrick Klos, Bedford, NH (US);
Michael Klos, Washington, UT (US)

(72) Inventors: Patrick Klos, Bedford, NH (US);
Michael Klos, Washington, UT (US)

(*) Notice: Subject to any disclaimer, the term of this patent is extended or adjusted under 35 U.S.C. 154(b) by 244 days.

(21) Appl. No.: 14/095,943

(22) Filed: Dec. 3, 2013

(65) Prior Publication Data

US 2014/0151447 A1    Jun. 5, 2014

Related U.S. Application Data

(60) Provisional application No. 61/732,503, filed on Dec. 3, 2012.

(51) Int. Cl.
*G06F 17/30* (2006.01)
*G06Q 10/06* (2012.01)
(52) U.S. Cl.
CPC ............... *G06F 17/30* (2013.01); *G06Q 10/06* (2013.01)

(58) Field of Classification Search
USPC ..................................................... 235/375
See application file for complete search history.

(56) References Cited

U.S. PATENT DOCUMENTS

| 4,323,773 | A | 4/1982 | Carpenter |
| 5,321,232 | A | 6/1994 | Ogle |
| 7,069,091 | B2 | 6/2006 | Williamson |
| 2004/0032421 | A1* | 2/2004 | Williamson ...... G06F 17/30017 715/704 |
| 2007/0007279 | A1* | 1/2007 | Chun .................. H05B 6/6441 219/506 |
| 2013/0052616 | A1* | 2/2013 | Silverstein ............ G09B 19/00 434/127 |

* cited by examiner

Primary Examiner — Michael G Lee
Assistant Examiner — David Tardif
(74) Attorney, Agent, or Firm — Gurr & Brande, PLLC; Robert A. Gurr

(57) ABSTRACT

An assistive food preparation system and method configured to match a code with at least one signal within a database for facilitating food preparation and transmit the signal associated with the numerical code for receipt by a user seeking food preparation assistance.

13 Claims, 3 Drawing Sheets

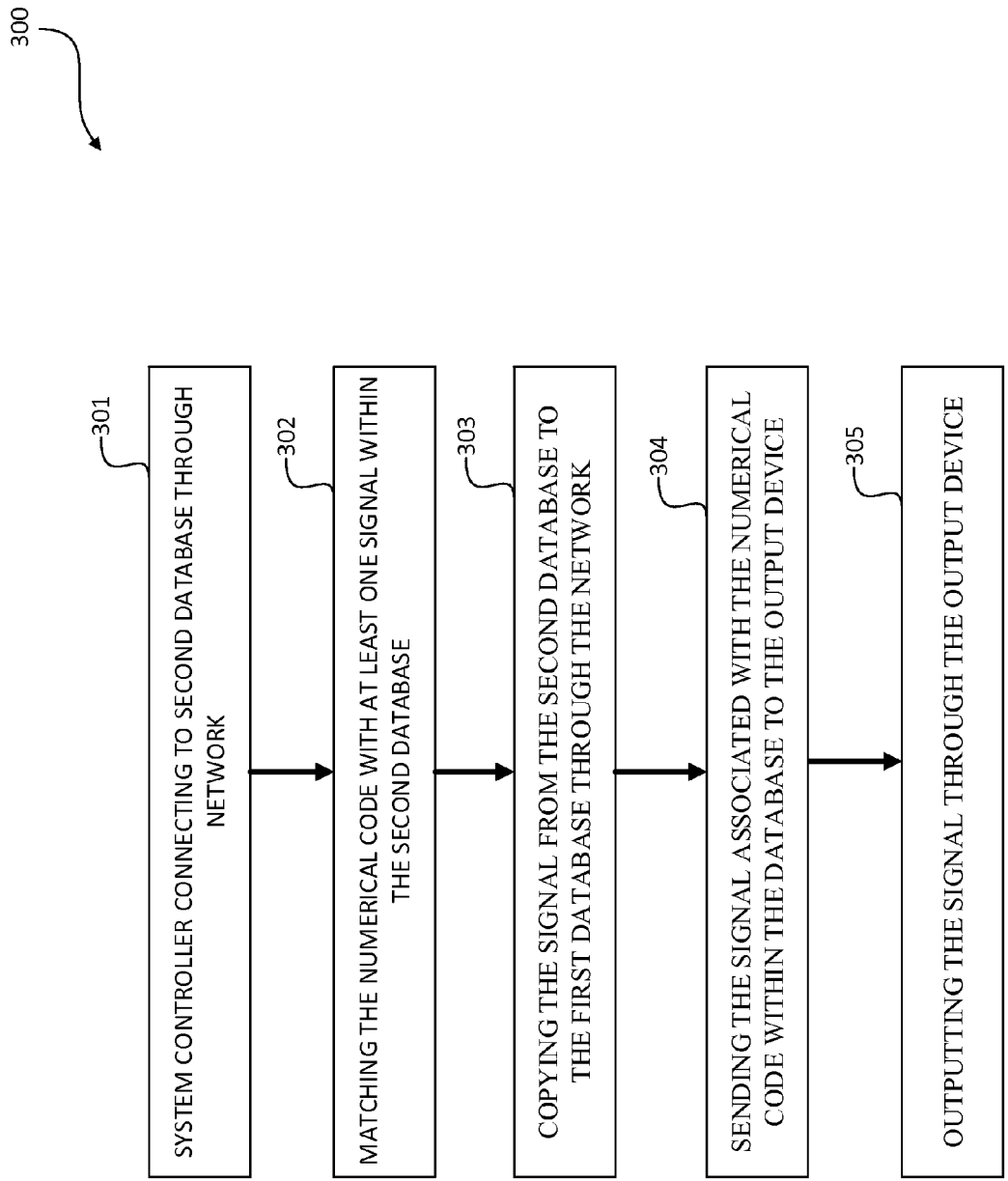

METHODS AND SYSTEMS OF ASSISTIVE FOOD PREPARATION

CROSS REFERENCE TO RELATED APPLICATIONS

This application claims the benefits of U.S. Provisional Application No. 61/732,503 entitled NOVEL METHODS AND SYSTEMS FOR ASSISTING AND AUTOMATING FOOD PREPARATION and filed on Dec. 3, 2012, the entirety of which is incorporated herein by reference.

TECHNICAL FIELD

The invention generally relates to systems and methods for providing assistive information and instruction during food preparation, including the use of universal product codes in order to facilitate the preparation of foods through a microwave oven or similar device.

BACKGROUND OF THE INVENTION

Food preparation at home can be a difficult and time-consuming chore despite the advances in technology implemented in various food preparation devices and food packaging configured for home usage. Thus, there is a continuing need in the art for further systems, devices and methods for facilitating the preparation of food in the home.

BRIEF SUMMARY OF THE INVENTION

The invention (which is also referred to hereinafter in some embodiments as "HELPMECOOK") generally relates to systems and methods for facilitating food preparation, particularly food preparation which takes place in the home with the assistance of home appliances or smart devices, such as cellphones, tablets, microwave ovens, convection ovens, toaster ovens, mixers or blenders.

In some embodiments, the invention is configured to assist people with food preparation by verbally and/or visually guiding them through the process of preparing and cooking food, and in some cases, automating one or more appliances used in the preparation process.

In one aspect of the invention an assistive food preparation system is provided. The system includes a system controller, a bar code capture device, a database, and an output device. The bar code capture device is connected to the system controller. The database is connected to the system controller. The database includes a plurality of signals, with each signal being associated with a plurality of numerical codes. The output device is coupled to the system controller. The bar code capture device is configured to capture and convert the bar code image into a numerical code, which is sent to the system controller. The system controller is further configured to match the numerical code with at least one signal within the database and send the signal associated with the numerical code within the database to the output device. Finally, the output device is configured to output the signal received from the system controller.

In some embodiments, the bar code capture device further includes an image capture sensor, with the image capture sensor configured to convert a bar code image into a numerical code.

In some embodiments, the bar code capture device further includes a laser-based bar code decoder, the decoder configured to convert a laser-based light reading into a numerical code.

In some embodiments, the output device further includes a display and each signal further includes a visual signal associated with at least one numerical code, with the system controller further configured to display the visual signal thru the display.

In some embodiments, the output device further includes an audio output device and each signal further includes an audio signal associated with at least one numerical code, with the system controller further configured to play the audio signal thru the audio output device.

In some embodiments, the output device further includes an input console and each signal further includes an input trigger associated with the numerical code, with the system controller further configured to detect the input trigger thru the input console in association with the numerical code.

In some embodiments, the system further includes a food preparation unit connected to the system controller, with the system controller further configured to the send a signal to the food preparation unit in response to the numerical code in the database.

In some embodiments, the food preparation unit is a microwave oven.

In some embodiments, the system further includes a network and a second database connected to the network. The database includes a plurality of signals, each signal associated with a plurality of numerical codes. The system controller is configured to access the second database through the network and find a match for the converted numerical code. The system controller is further configured to move the signal associated with the matched numerical code from the second database to the first database. The system controller is then further configured to send the signal associated with the numerical code within the database to the output device. The output device is then configured to output the signal received from the system controller.

In some embodiments, a method of providing assistive food preparation instruction is provided. The method includes a system comprising a system controller, a bar code capture device, a database containing a plurality of signals, and an output device and comprises the steps of: capturing a bar code image and forwarding the image to the system controller; converting the bar code image into a numerical code; matching the numerical code with a least one signal within the database; sending the signal associated with the numerical code within the database to the output device; and outputting the signal through the output device.

In some embodiments, the system further includes an image capture sensor and the method further includes the step of converting an image into a numerical code for matching with at least one signal within the database.

In some embodiments, the system further includes a laser-based bar code decoder and the method further includes the step of converting a laser-based light reading into a numerical code for matching with at least one signal within the database.

In some embodiments, the system further includes a display and method further includes the step of sending a visual signal through the display based on the association with the numerical code within the database.

In some embodiments, the system further includes an audio output device and the method further includes the step of sending an audio signal through the audio output device based on the association with the numeric code within the database.

In some embodiments, the system further includes an input console and the method further includes the steps of: matching an input trigger to a numeric code within the database and detecting the input trigger thru the input console in association with the numeric code.

In some embodiments, the system further includes a food preparation unit connected to the system controller and the method further includes the step of sending a signal to the food preparation unit in response to the numerical code in the database.

In some embodiments, the system further includes a network and a second database connected to the network, the database including a plurality of signals, each signal associated with a plurality of numerical codes and the method includes the steps of: accessing the second database through the network; matching the converted numerical codes with at least one signal; moving the signal from the second database to the first database; and sending the signal to the output device, cause the output device to the receive the signal.

BRIEF DESCRIPTION OF THE DRAWINGS

Other advantages of the invention will be readily appreciated as the same becomes better understood by reference to the following detailed description when considered in connection with the accompanying drawings:

FIG. 3 is a flowchart illustrating a method for providing assistive food preparation according to another embodiment of the invention.

DETAILED DESCRIPTION AND BEST MODE OF IMPLEMENTATION

Non-limiting and exemplary embodiments of the invention, which are directed to systems and methods for providing assistive information and instruction during food preparation, are described herein.

A selected embodiment of the invention will now be explained with reference to the drawings. It will be apparent to those skilled in the art from this disclosure that the following description of the embodiments of the invention is provided for illustration only and not for the purpose of limiting the invention as defined by the appended claims and their equivalents.

Referring to the figures, where like numerals indicate like or corresponding parts or steps throughout the several views, the systems and methods are constructed in accordance with the invention and configured for providing assistive information and instruction during food preparation.

Figure 1:
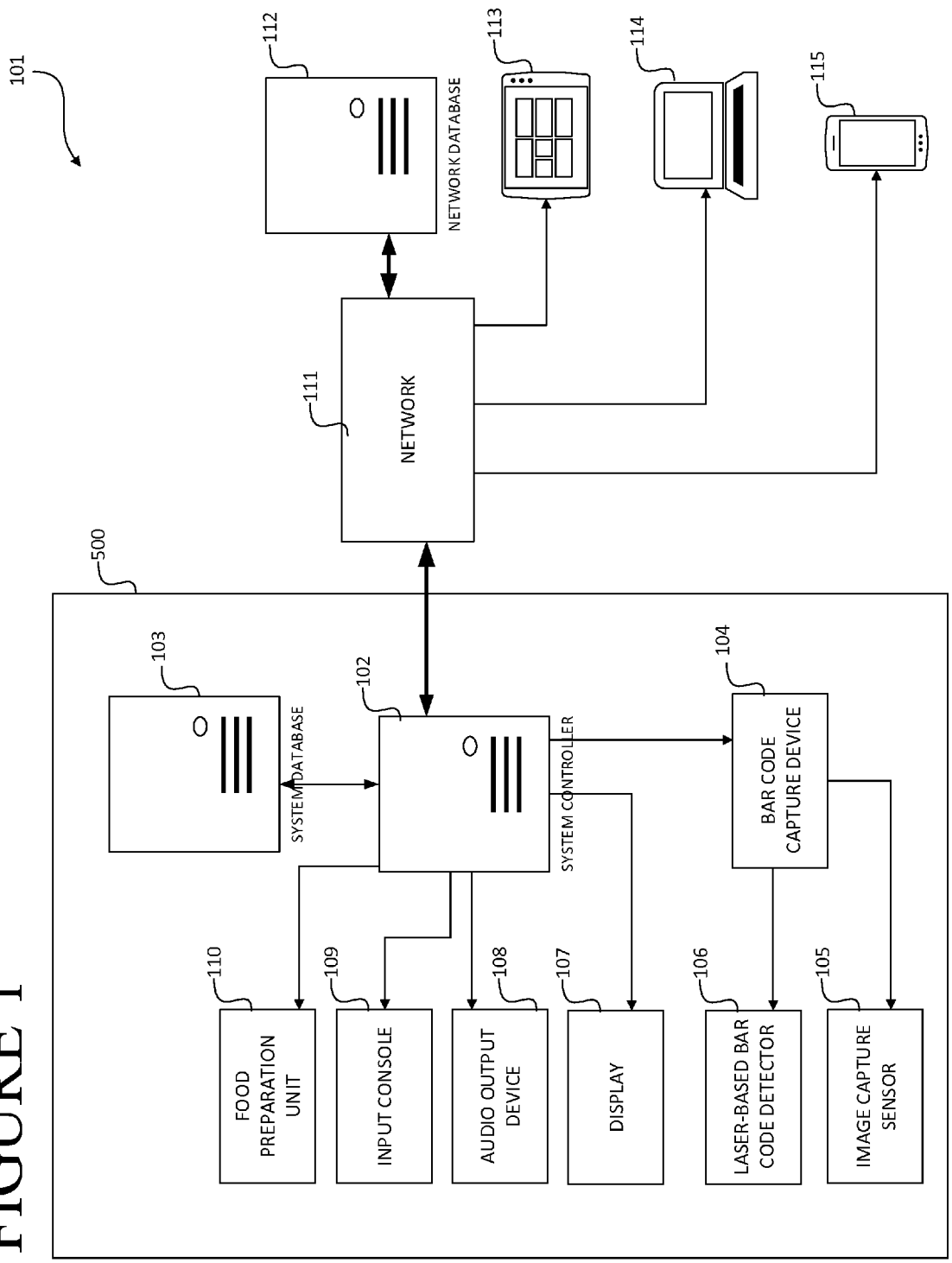
FIG. 1 is a diagram illustrating a system for providing assistive food preparation according to some embodiments of the invention.

FIG. 1 is a schematic diagram of a system 101 for providing assistive food preparation according to one possible embodiment of the invention. This schematic diagram includes multiple embodiments of the invention. In one particular embodiment, the system is fully integrated within a food preparation device 500 (i.e. a microwave, convection, or other type of oven, or other device). In another particular embodiment, the system can incorporate an externally connected device (a smartphone, tablet, laptop, etc.). Any particular discrepancies between these particular types of embodiments will be explained through the explanation of the figures.

The system 101 includes a system controller 102, a system database 103, and a bar code capture device 104. The system controller 102 provides most of the system functionality between the other elements within the system and implements the method for providing assistive food preparation to the user in conjunction with the other system elements. The system controller may be fully integrated into a food preparation device 500, or can be a logical component of an externally connected device in communication with the food preparation device 500 (i.e. a tablet computer 113, a laptop 114, or a smartphone 115). The externally connected device can either be in direct communication with the food preparation device 500 or can maintain indirect communication to the system 101 through the network 111. In some embodiments, the device may not be connected either directly or indirectly with the food preparation device 500, but may instead provide assistance which leads to the manual operation of the food preparation device 500.

The system database 103 is connected to the system controller 102 and provides the principle means of storage for the system 101. The system database 103 contains a plurality of signals, with at least each signal having an association to at least one numerical code decoded from a UPC code, or other digital code, on a particular food item. There will be additional discussion on UPC codes later on in the specification. For the purposes of the system database 103, the system controller 102 with the system database in order to find a match between at least one signal stored within the system database 103 and the code captured by the bar code capture device 104.

A bar code capture device 104 is in communication with the system controller 102 and is the principle means of inputting UPC codes into the system 101 in order to find matching signals within the system database 103. The bar code capture device 104 is incorporated into the system 101 in order to take the input from various capture devices in, convert the bar code into a numerical code, and forward the numerical code to the system controller 102.

The bar code capture device 104 also includes a laser-based bar code detector 106 or an image capture sensor 105. The laser-based bar code detector 106 utilizes a focus laser light source in order to capture a bar code from a food package. The detector 106 registers a bar code based on the reflective resistance from the bar code on the package in order to produce the necessary bar code signal. This signal is then converted into a numerical code and transmitted to the system controller 102. The image capture sensor 105 will capture an image of a bar code on a food package and forward that image to the bar code capture device 104 for conversion into a numerical code. The image capture sensor can utilize any digital image capture technology, either CCD (charge-coupled device) or CMOS (complementary metal-oxide-semiconductor). Furthermore, the image capture sensor 105 may be integrated into the food preparation device 500 or in communication with the system 101 through an externally connected device (tablet 113, laptop 114, smartphone 115).

The bar code capture device 104 can be modified to capture various types of product identifiers. These types can include, but is not limited to, EAN/UPC, GS1 DATABAR, GS1-128, ITF-14, GS1-DATAMATRIX, GS1 QR CODE, and COMPOSITE COMPONENT bar code types or other possible sources (RFID).

The system controller 102 is also connected to a display 107, an audio output device 108, an input console 109, and/or a food preparation unit 110. Once the system controller 102 converts the inputted bar code from the bar code capture device 104, the system controller 102 will attempt to find an associated signal within the system database 103.

Once an associated signal is found within the system database 103 then the signal is then outputted through the appropriate signal output device within the system 101. This signal can be, but is not limited to, audio/visual, audio only, or tactic depending on the predetermined coding within the system database 103. Furthermore, the signal may also contain predetermined preparation instructions that are forwarded to the food preparation unit 110. These signals may be particularly coded in order to assist users that require those particular signals in order to move through the food preparation process with the food preparation device 500. This specification will now discuss various types of signals and their possible outputs within the system 101.

If the system controller 102 finds a numerical code match with a video signal within the system database 103, the system controller 102 will then output the signal through the display 107. If the system controller 102 finds a numerical code match with an audio signal within the system database 103, the system controller 102 will then output the signal through the audio output device 108. Simultaneous output through the display 107 and the speaker 108 will occur in the event of a numerical code match with an audio/video signal within the system database 103. The system 101 can also require that the user interact with system 101 through the input console 109 in order to activate the food preparation unit 110. In this situation, the system controller will find a numerical match between a bar code number code and a trigger signal within the system database 103. These trigger signals may set the system to require the input from the user prior to moving the process forward. This type of signal will ensure that the food associated with the particular UPC code is prepared by the proper method established within the database. Any one of these signals may be outputted directly through the various output elements or through any externally connected device (tablet 113, laptop 114, smartphone 115) that is in communication with the system 101. Multiple signals may be associated with a UPC numerical code within the system database 103 in order to provide a complete assistive method of food preparation for a user.

Finally, the system database 103 may also contains programming signals that directly send instructions for food preparation to the food preparation unit 110. These signals can include timing and temperature instructions depending on the type of food preparation unit 100 incorporated into the food preparation device 500.

Below is non-limiting example of multiple signals within the system database 103 used in tandem in order to direct a user through a food preparation process. With each step the system outputs a particular signal in order to either instruct the user or program the food preparation device 500. For example the system can:

Instruct the user to remove tray from box
Instruct the user to peal back the film cover
Programs the food preparation unit 110 for 3.5 minutes on HIGH (given the food preparation unit is a microwave).
Instruct the user to put the tray in the food preparation device 500.
Automatically starts the food preparation device 500.
After the food preparation device 500 has finished, instruct the user to remove the meal.
Instruct the user with additional preparation directions (I.E. to peal back the film cover and stir the meal then restore the film cover).

Figure 2:
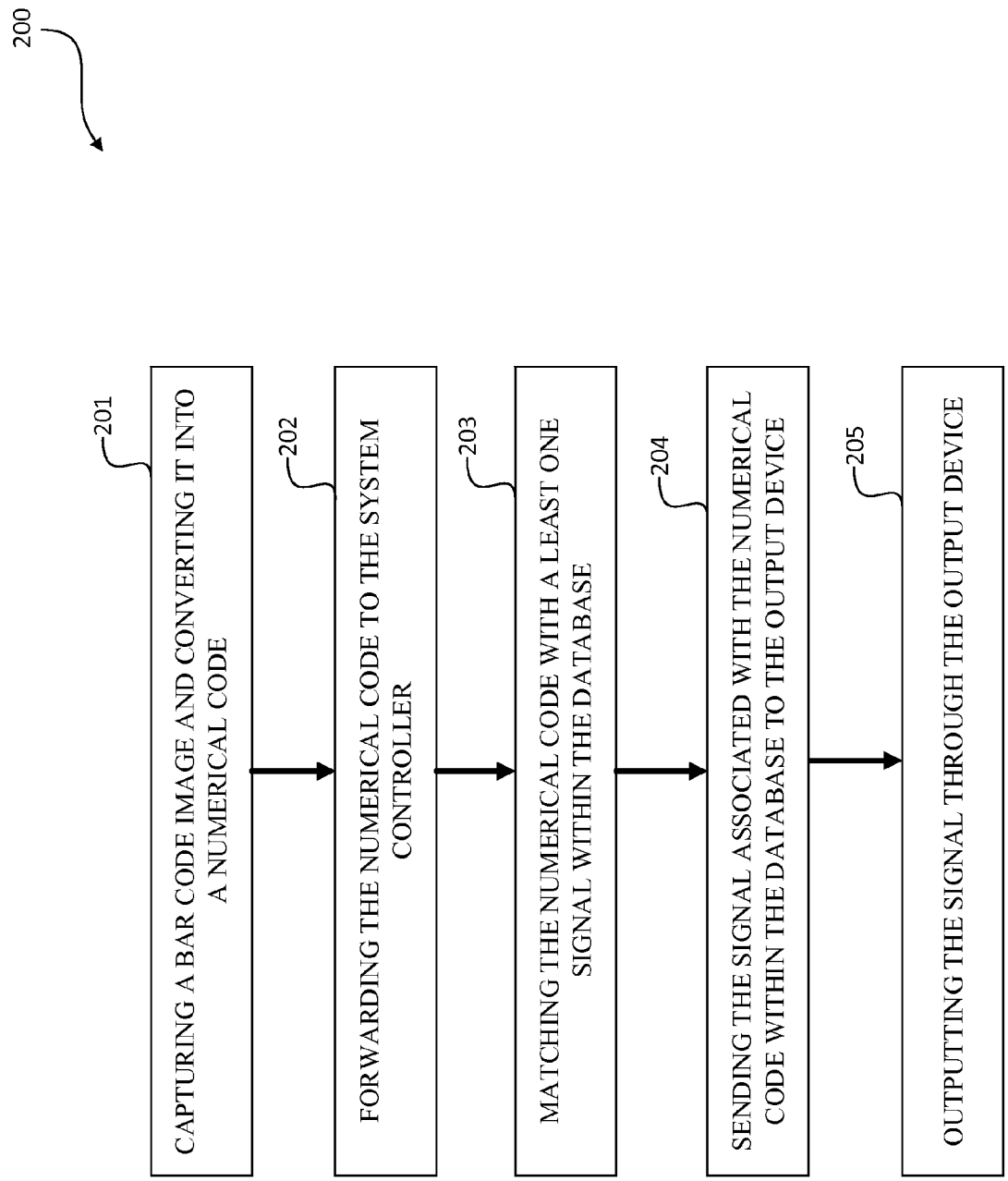
FIG. 2 is a flowchart illustrating a method for providing assistive food preparation according to an embodiment of the invention.

FIG. 2 is a flowchart indicating the initial method of providing a method of assistive food preparation, according to an embodiment of the invention. The method begins at step 201, where the system 101 captures a bar code through a bar code capture device 104.

Next, at step 202, the system controller 102 converts the bar code signal inputted into the system 101. This conversion can occur either through the internal system controller 102 or through any of the external devices in communication with the system 101 (tablet 113, laptop 114, or smartphone 115). The system 101, at step 203, will then attempt to find a match for the numerical code within the system database 103. If a match is found then the system will proceed onto step 204. Otherwise, the system 101 will proceed onto the secondary method outlined within FIG. 3. Next, once a match for the numerical code is found within the system database 103, the system 101 will send the signal associated with the numerical code within the system database 103 to the appropriate output device connected to the system 101. Finally, at step 205, the system will output the signal through the appropriate output device.

FIG. 3 is a method flowchart that outlines the secondary database method utilized by the system 101. In the event that a corresponding signal is not found within the system database 103, the system is connected by way of a network interface 111 to a network database 112. The secondary method begins at step 301 with the system controller 102 connecting to the network database through the network 111. Next, at step 302, the system controller 102 attempts to match the numerical code received from the bar code capture device 104 with one of the associated signals found within the network database 112. Next, if a matching associated signal is found within the network database 112, the system controller will copy the signal from the network database 112 to the system database 103 as shown by step 303. This will ensure the use of the signal for immediate output and for use later one by the user. Then at steps 304 and 305, the system 101 proceeds normally by sending the signal to the output device and outputting the signal to the user.

Exemplary embodiments of these systems and methods are described above in detail. The systems and methods are not limited to the specific embodiments described herein, but rather, components of the systems and/or steps of the methods may be utilized independently and separately from other components and/or steps described herein. For example, the systems may also be used in combination with other systems and methods, and is not limited to practice with only the system and method as described herein.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims as recited, including equivalents thereof, and may include other examples that occur to those skilled in the art. Other aspects and features of the invention may be obtained from a study of the drawings, the disclosure, and the appended claims, all of which is include in its scope and equivalents. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. An assistive food preparation system, the system comprising:
   a system controller;
   a bar code capture device connected to the system controller;
   a database connected to the system controller, the database including a plurality of signals, each signal associated with a plurality of numerical codes; and
   an output device coupled to the system controller;
   wherein the bar code capture device is configured to capture a barcode image and forward the image to the system controller, the system controller configured to convert the bar code image into a numerical code, the system controller further configured to match the numerical code with at least one signal within the database, and the system controller further configured to send the signal associated with the numerical code within the database to the output device, the output device comprising one or more speakers and configured to output the signal received from the system controller as audible, verbal instructions to a user;
   wherein the system controller is further configured to match the numerical code with a programming signal, wherein the system controller sends the programming signal to a food preparation unit to configure at least one of a cook temperature and a cook time; and
   wherein the system controller is further configured to match the numerical code with at least one trigger signal, wherein the trigger signal is sent to the food preparation unit, and, in response to receiving the trigger signal, the food preparation unit is configured to receive input from a user in accordance with the verbal instructions.

2. A system as recited in claim 1, wherein the bar code capture device further comprises an image capture sensor, the image capture sensor configured to convert a bar code image into a numerical code.

3. A system as recited in claim 1 wherein the bar code capture device further comprises a laser-based bar code decoder, the decoder configured to convert a laser-based light reading into a numerical code.

4. A system as recited in claim 1, wherein the output device further comprises a display and each signal further including a visual signal associated with at least one numerical code, the system controller configured to display the visual signal thru the display.

5. A system as recited in claim 1, wherein the food preparation unit is a microwave oven.

6. A system as recited in claim 1, wherein the system further comprises a network and a second database connected to the network, the database including a plurality of signals, each signal associated with a plurality of numerical codes, the system controller configured to access the second database through the network and find a match for the converted numerical code, the system controller further configured to move the signal associated with the matched numerical code from the second database to the first database, the system controller further configured to send the signal associated with the numerical code within the database to the output device, the output device configured to output the signal received from the system controller.

7. A method of providing assistive food preparation instruction and automation of food preparation for a handicapped user through a system including a system controller, a bar code capture device, a database containing a plurality of signals, an output device, and a food preparation unit and comprising the steps of:
   capturing a bar code image and forwarding the image to the system controller;
   converting the bar code image into a numerical code;
   matching the numerical code with a least one audio signal within the database;

sending the audio signal associated with the numerical code within the database to the output device, wherein the output device comprises a speaker;

outputting the audio signal as verbal instructions through the speaker of the output device;

matching the numerical code with at least one programming signal, wherein the programming signal is sent directly to the food preparation device to set at least one of a cook temperature and a cook time; and matching the numerical code with at least one trigger signal, wherein the food preparation unit is configured to require input from a user.

8. The method according to claim 7, wherein the system further comprises an image capture sensor, the method further comprising the steps of converting an image into a numerical code for matching with at least one signal within the database.

9. The method according to claim 7, wherein the system further comprises a laser-based bar code decoder, the method further comprising the step of converting a laser-based light reading into a numerical code for matching with at least one signal within the database.

10. The method according to claim 7, wherein the system further comprises a display, the method further comprising the step of sending a visual signal through the display based on the association with the numerical code within the database.

11. The method according to claim 7, wherein the system further comprises an input console, the method further comprising the steps of:

matching an input trigger to a numeric code within the database; and detecting the input trigger thru the input console in association with the numeric code.

12. The method according to claim 7, wherein the food preparation unit is a microwave oven.

13. The method according to claim 7, wherein the system further includes a network and a second database connected to the network, the database including a plurality of signals, each signal associated with a plurality of numerical codes, the method further comprising the steps of:

accessing the second database through the network;

matching the converted numerical codes with at least one signal;

moving the signal from the second database to the first database; and sending the signal to the output device.

* * * * *